_United States Patent_ [19]

Van De Mark

[11] Patent Number: 4,973,420

[45] Date of Patent: * Nov. 27, 1990

[54] STRIPPER COMPOSITION FOR REMOVAL OF PROTECTIVE COATINGS

[75] Inventor: Michael R. Van De Mark, Rolla, Mo.

[73] Assignee: Hoechst Celanese Corporation, Somerville, N.J.

[*] Notice: The portion of the term of this patent subsequent to May 16, 2006 has been disclaimed.

[21] Appl. No.: 347,270

[22] Filed: May 4, 1989

[51] Int. Cl.$^5$ .......................... C11D 7/00; C11D 7/26; C11D 7/24

[52] U.S. Cl. ..................................... 252/170; 252/171; 252/DIG. 8; 252/162; 252/172; 252/364; 134/38; 134/42

[58] Field of Search ......... 252/162, 170, 172, DIG. 8, 252/364, 171; 134/38; 549/368

[56] References Cited

U.S. PATENT DOCUMENTS

| | | | |
|---|---|---|---|
| Re. 27,432 | 7/1972 | Torrenzano et al. | 252/DIG. 8 |
| 2,495,728 | 1/1950 | Hutson et al. | 252/DIG. 8 |
| 2,495,729 | 1/1950 | Hutson et al. | 252/DIG. 8 |
| 2,916,366 | 12/1959 | Heinrich et al. | 44/69 |
| 2,968,638 | 1/1961 | Meckler | 252/DIG. 8 |
| 3,702,304 | 11/1972 | Esposito | 252/171 |
| 3,723,331 | 3/1973 | Correia | 252/165 |
| 3,743,542 | 7/1973 | Cooper et al. | 252/171 |
| 3,864,413 | 2/1975 | Beckers | 260/652.5 R |
| 3,904,430 | 9/1975 | Tipping et al. | 143/11 |
| 4,115,461 | 9/1978 | Spencer | 260/652.5 R |
| 4,392,000 | 7/1983 | Ryckaert | 570/104 |
| 4,595,396 | 6/1986 | Erdman | 44/63 |

FOREIGN PATENT DOCUMENTS

| | | |
|---|---|---|
| 2118870 | 10/1972 | Fed. Rep. of Germany . |
| 2123563 | 11/1972 | Fed. Rep. of Germany . |
| 2024243 | 1/1980 | United Kingdom . |

_Primary Examiner_—Paul Lieberman
_Assistant Examiner_—J. Darland
_Attorney, Agent, or Firm_—Depaoli & O'Brien

[57] ABSTRACT

Stripper compositions for coatings comprise trioxane. An aromatic hydrocarbon and aliphatic alcohol can be added to improve solubility parameters. Xylene and methanol are the preferred co-solvents.

12 Claims, No Drawings

STRIPPER COMPOSITION FOR REMOVAL OF PROTECTIVE COATINGS

This is a Continuation-in-part application of Ser. No. 205,143, filed June 10, 1988.

BACKGROUND OF THE INVENTION

1. Field of the Invention

This invention relates to trioxane-containing compositions for removing or stripping paint, varnish, and like coatings from wood and metal surfaces. 2. Review of the Prior Art Removal of protective coatings from wood and metal surfaces has long been a difficult and laborious operation involving the use of flame, heat, and/or chipping tools. Such labor has been minimized by using solvents to soften and/or lift a coating from a protected surface.

Paint and varnish removers are of two main types according to method of use: application removers and immersion removers. Application removers are usually applied by brushing or spraying and are used for small jobs or for items that cannot be immersed. Immersion removers are used as either cold or hot baths where it is practical and cost efficient to install equipment that can strip numerous items. Cold baths contain solvents such as methylene chloride, and hot baths often contain caustic soda.

Compositions for removing protective coatings have generally utilized methylene chloride and other halogenated aliphatic hydrocarbons.

According to the "Kirk-Othmer Encyclopedia of Chemical Technology," Vol. 16, pp. 762–768, a typical methylene chloride remover contains 70–85% methylene chloride, 5–10% alcohol co-solvent, typically methanol, and 0–10% hydrocarbon solvent or ketones, the remainder being paraffin wax, methylcellulose, an amine, and surfactants or emulsifiers.

As disclosed in the above-mentioned passage from "Kirk-Othmer", paint and varnish removers other than methylene chloride are also known including inexpensive solvents and blends of solvents including acetone, methyl ethyl ketone, toluene, xylene, blends of alcohol and acetates, tetrahydrofuran, dimethylformamide, and 1,1,2-trimethoxyethane.

Many patents disclose specific coating remover compositions which contain chlorinated hydrocarbon solvents. Below are listed typical examples.

U.S. Pat. No. 2,495,729 discloses use of a film-forming base material, such as cellulose esters to increase the viscosity and form a protective film which enables the solvent and softening agents of a coatings remover to be confined within the film to exert maximum softening and solvent action. The solvents include a mixture of benzene and aliphatic alcohols or cyclic aliphatic oxides, such as tetramethylene oxide. An aliphatic acid ester, such as ethyl acetate in acetone can also be added. The benzene may be replaced by a mixture of halogenated aliphatic hydrocarbons.

U.S. Pat. No. 3,179,609 describes compositions useful for removing coatings and finishes such as paints, varnishes, lacquers, shellac, gums, and natural and synthetic resins which comprise (a) an active organic solvent, including binary, tertiary, etc., mixtures thereof, (b) a viscosity thickener comprising resinous poly(ethylene oxides), and (c) an evaporation retardant or film-forming compound. Numerous solvents (a) are disclosed including binary mixtures. Methylene chloride containing benzene, methanol, acetone, and the like are preferred.

U.S. Pat. No. 3,538,007 discloses a paint stripper comprising 54–77 parts of chlorinated liquid hydrocarbon solvent, 1–4 parts of carboxylic acid having 1–4 carbons, 1–6 parts of propargyl alcohol, 0–2 parts of nonionic wetting agent, 0–15 parts of liquid aromatic hydrocarbon solvents, 0–6 parts of a coupling agent, 0–30 parts of phenol or alkyl substituted phenol, 0–2 parts of a thickener, and 0–2 parts of an evaporation retarder. The aromatic liquid hydrocarbon can be benzene, toluene, or xylene.

U.S. Pat. No. 3,574,123 describes a paint stripper comprising 50–90 parts of a chlorinated liquid hydrocarbon solvent, 2–15 parts of a lower aliphatic alcohol or glycol ethers, 0.1–15 parts of a lower carboxylic acid, 2–30 parts of hydroxybenzenes, 2–10 parts of a fatty acid sulfonate or a salt of a fatty amine carboxylic acid, and 0.1–10 parts of aqueous ammonium bifluoride. This composition can also contain inert organic aromatic hydrocarbon solvents such as benzene, toluene, xylene, ethylbenzene, otho-ethyltoluene, di-ethylbenzene, and isoprooyl benzene, the lower alkyl substituted benzenes boiling at 170° F. and higher being preferred.

U.S. Pat. No. 3,592,691 describes the removal of photo resist mask residuals from a semiconductor substrate by immersing the substrate in a photoresist solvent and heating the solvent at 150°–250° C. and at a pressure of about 300 psig for a time period of ¼–3 hours. The solvent composition comprises trichloroethylene, isopropanol, and xylene with up to a few percent of methylene chloride. The isopropanol may be replaced wholly or partially with lower boiling point aliphatic alcohols such as ethanol.

U.S. Pat. No. 3,743,542 describes a method for removing paint from metal surfaces by boiling a solvent or solvent mixture and contacting the painted metal surface with the vapors of the solvent mixture, preferably while refluxing the vapors in a closed system. It is especially useful for removing durable paints such as those based on vinyl, acrylic, or epoxy resins. The stripping composition comprises solvents and mixtures thereof including chlorinated liquid hydrocarbons, hydrogenated aromatic solvents, saturated heterocyclic compounds, surface active agents, imidazole derivatives, alkynyl alcohols, glycol ethers, carboxylic acids, ethanolated alkyl guanidine amine complexes, and aliphatic alcohols.

Examples of patent which disclose alternative solvents are mentioned below.

U.S. Re No. 27,432 is directed to a process for removing polymeric materials from processing equipment with tetrahydrofuran. It teaches that numerous solvents have been known for dissolving vinyl halides of various molecular weights including trimethylene oxide, tetramethyl urea, dimethyl acetamide, tetrahydrofuran, cyclohexanone, cyclopentanone, cyclohexene oxide, diethyl acetamide, methyl ethyl ketone, and dioxane.

U.S. Pat. No. 3,784,477 relates to removal of paints, varnishes, and similar finishes from wood and metal objects without damage to grain or glue joints. It teaches that xylene or aromatic naphthas can be used as an extender for solvents dimethylformamide or dimethyl acetamide, with little chance in paint removal activity, and further that xylene can be diluted or extended freely with methyl alcohol up to about 20% of its weight.

It is also known to incorporate cyclic ethers, including trioxane, into cleaning and coating remover solvents.

For example, U.S. Pat. No. 3,723,331 discloses a method for stabilizing halogenated solvents derived from aliphatic saturated hydrocarbons. Stabilization is accomplished by incorporating therein trioxane associated with an aliphatic alcohol, particularly tertiary butanol and/or an epoxide which is liquid at ordinary temperature, particularly butylene oxide. The compositions are used as solvents for grease removal and/or for cleaning of metal parts or components. British Patent No. 2,024,243 discloses a similar composition for stabilizing 1,1,1-trichloroethane in which tertiary butyl alcohol trioxane, an epoxide, a nitroalkane and an aliphatic or cyclic amine are added.

U.S. Pat. No. 3,904,430 describes a method of cleaning a contaminated article in a system which comprises using a solvent mixture comprising a halogenated hydrocarbon solvent and an auxiliary solvent which does not form a azeotrope with the halogenated hydrocarbon solvent wherein the article is contacted with a first heated liquid mixture of the solvents and the article rinsed with a second liquid mixture containing a lower proportion of the auxiliary solvent. Auxiliary solvents which are disclosed include alcohols and cyclic ethers of which 1,4-dioxane is specifically disclosed.

German Offenlegungsschrift No. 2,118,870 discloses a paint remover and solvent for varnishes and paints comprising an acetal of diol such as 1,3-dioxolane and 5 to 60 parts, preferably 10 to 40 parts, based 100 parts of the cyclic acetal or acetal blend of trioxane. The addition of trioxane results in the retention of the volatile solvents that are effective during the paint removal. Specific examples using trioxane include 1,3-dioxolane/trioxane in a 4:1 mixing ratio, and butane diol-1,4-formal/trioxane in a 7:3 mixing ratio.

German Offenlegungsschrift No. 2,123,563 discloses a paint remover, solvent, and the like based on organic solvents containing 5 to 60 and preferably 10 to 50 parts by weight of trioxane based on 100 parts per weight of the mixture as a retention agent. Specific examples include trioxane mixed with each of chlorinated hydrocarbons, xylene, ethyl acetate, methyl ethyl ketone and acetone.

U.S. Pat. No. 4,595,396 teaches the solubility of trioxane in methanol, absolute ethanol, and 95% ethanol at temperatures below and above ambient. Such solutions are used for fuel transport and as fuel.

Substantially all currently used commercial strippers contain chlorinated hydrocarbons and particularly methylene chloride. These chlorinated hydrocarbons are harmful to the skin and recently have been considered as potentially harmful to the environment, in general. There is accordingly a need for a solvent having fast lifting speed for common coatings and which is also harmless to the user and environment.

Moreover, because immersion stripping has many practical advantages, there is also a need for a stripper composition for use in hot baths that is less volatile than one based on methylene chloride (b.p.=42° C.), less toxic, and less painful upon skin contact.

SUMMARY OF THE INVENTION

It has surprisingly been discovered that trioxane is a very fast and effective solvent for lifting common coatings. Moreover, the solubility parameters of trioxane can be favorably modified by admixing therewith an aromatic hydrocarbon and an aliphatic alcohol to provide a coating remover composition which behaves similarly to methylene chloride compositions, but is not believed to be as harmful to the user or the environment.

DESCRIPTION OF THE PREFERRED EMBODIMENTS

The compound, 1,3,5,-trioxane, is commonly referred to as trioxane or trioxymethylene. Trioxane as used herein is a cyclic trimer of formaldehyde having the structural formula below:

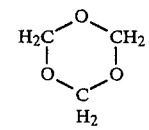

At room temperature, trioxane is solid. Use of trioxane as a coating remover thus involves heating trioxane at a temperature above its melting point, i.e., 64° C. or dissolving trioxane in a solvent. When trioxane is dissolved in methanol and other solvents, heat is absorbed so that the solubility of trioxane in methanol and similar solvents increases with increasing temperature. The solubility of trioxane in methanol is shown in the following table:

TABLE I

| SOLUBILITY OF TRIOXANE IN METHANOL | |
|---|---|
| Temperature, °C. | Wt. % Trioxane in Liquid Phase |
| 0.1 | 14 |
| 10.2 | 21 |
| 18.9 | 31 |
| 25.0 | 37 |
| 30.0 | 44 |
| 40.0 | 60 |
| 4.0 (melting point) | 100 |

The solubilities of chemically pure trioxane in absolute ethanol and in 95% ethanol at various temperatures are approximately as follows:

TABLE II

| SOLUBILITY OF TRIOXANE IN ABSOLUTE ETHANOL | |
|---|---|
| Temperature, °C. | Wt. % Trioxane in Liquid Phase |
| 10 | 12 |
| 15 | 15 |
| 20 | 19 |
| 25 | 25 |
| 30 | 32 |
| 35 | 42 |
| 40 | 52 |
| 45 (too high to determine accurately) | |

TABLE III

| SOLUBILITY OF TRIOXANE IN 95% ETHANOL, 5% $H_2O$ | |
|---|---|
| Temperature, °C. | Wt. % Trioxane in Liquid Phase |
| 10 | 16 |
| 15 | 18 |
| 20 | 23 |
| 25 | 28 |
| 30 | 37 |
| 35 | 50 |
| 40 (too high to determine accurately) | |

The data indicates that the solubility of trioxane in absolute or 95 percent ethanol is slightly less at a given temperature than the solubility of trioxane in methanol. However, both ethanol and water can be used as major or minor portions of the solvent in trioxane-methanol compositions. The addition of water to ethanol increases the solubility of trioxane at a given temperature, i.e., water increases the solubility of trioxane in ethanol at a given temperature and reduces the temperature at which a solution of a given concentration can be maintained without crystallization of the trioxane. Water can also be expected to have the same effect when it is a portion of a methanol-trioxane solution.

To provide a satisfactory coating remover, it is preferable to find a compound or compound mixture which has physical properties as close as possible to those of methylene chloride which is the most acceptable coating remover used. Trioxane is more like methylene chloride in structure than is dioxane, dimethylformamide, tetrahydrofuran, or tetramethylene oxide, which latter compounds have been suggested as coating removers. Moreover, it is possible to modify trioxane-containing coating removers by addition of co-solvents to better emulate the solubility or solvent properties of methylene chloride. Thus, it is preferred that the trioxane coating removers of this invention contain at least about 20 wt. % trioxane, about 25-55 wt. % of an aromatic hydrocarbon and 25-55 wt. % of an aliphatic alcohol. More preferably, the coating stripper composition of this invention contains about 25-40 wt. % trioxane, 30-50 wt. % aromatic and 30-50 wt. % alcohol. It is preferred to have the aromatic and alcohol present in equal amounts by weight.

In order to emulate the solvent properties of methylene chloride, it was necessary to modify the properties of trioxane expecially with respect to hydrogen bonding capabilities. Methylene chloride is very low on hydrogen bonding as compared to trioxane. In the solvent composition of this invention, the aromatics which have low hydrogen bonding capability are added to counterbalance the hydrogen bonding of trioxane. The wetting ability of the alcohol is needed to add a proton donor for hydrogen bonding.

Suitable aromatic hydrocarbons for use in the coating strippers of this invention include benzene, toluene, xylenes, and alkylbenzenes, including ethyl benzene and the like. A xylene or a mixture of xylenes are the preferred aromatic solvents. Other alkylbenzenes, such as di-ethylbenzene, isopropyl benzene, otho-ethyltoluene, trimethylbenzenes, and cumene are reasonably satisfactory, if the alkane end is not more than a $C_5$ hydrocarbon. It is also to be understood, that non-hydrocarbon aromatics can be used so long as the hetero groups are minimized and do not significantly change the hydrogen bonding properties relative to those of the corresponding aromatic hydrocarbon. Thus, hetero substituents can be mono-substituted off the aromatic ring. Among the useful substituents include ether groups, carbonyl groups and ester groups. Specific compounds include $C_1$-$C_4$ alkoxy benzenes such as methoxy benzene, propoxy benzene, and the like, and $C_1$-$C_4$ alkyl benzoate esters such as methyl benzoate, ethyl benzoate, etc. Thus, the aromatic hydrocarbons as used in this invention include such minimally hetero atom-substituted aromatics.

The aliphatic alcohol may be selected from the group consisting of methanol, ethanol, isopropanol, n-propanol, n-butanol, isobutanol, tert-butanol, the solubility of trioxane being progressively less in this series. Methanol is the preferred solvent.

In commercial use, the composition is suitably further modified by adding waxes or oils to reduce evaporation and by adding thickeners to reduce flow so that it can be used for vertical surface stripping.

The most preferred composition for use at ambient temperatures is approximately 35% methanol, 35% xylene, and 30% trioxane. The content of trioxane can be lowered, but doing so increases the time required for removal of coatings. At ambient temperatures, the solubility of trioxane is about 33% by weight. However, to provide a margin of safety in the event that the temperature drops, 30% is preferred. This coatings stripper is less dense than the methylene chloride strippers and is 65% water soluble.

The paint stripper composition of this invention is useful for removing or stripping a wide variety of coatings such as paints, varnishes, enamels, lacquers, and the like, and more particularly neoprenes, polyesters, polycarbonates, silicon elastomers, phenolics, vinyl halide polymers and copolymers, acrylates, and polyvinyl alcohol coatings at ambient temperatures. It is particularly suitable for alkyd, latex, and urethane paints and for varnishes.

Stripper compositions based on trioxane can be useful for warm-to-hot baths (35°-60° C.) that offer many of the advantages of conventional immersion-type removers without the disadvantages of volatility and/or causticity. Moreover, mixtures of alcohols can be utilized in such baths to provide low volatility and adequate solvency. The elevation of temperature also increases the solubility of trioxane and, thus, allows for increases in the amount of trioxane which can be included in the stripper.

The invention may be more clearly understood by reference to the following examples which are given on a weight basis.

EXAMPLE 1

In this example, the solubility parameters of trioxane were compared to those of methylene chloride.

Using a modification of the Crowley method to determine the hydrogen bonding capability of trioxane, solutions of trioxane in benzene were prepared with 8% and 20% trioxane. This solvent system was used to prepare 0.1 M ethanol solutions in which the hydroxyl hydrogen was replaced with deuterium for FT-IR.

Solutions of trioxane in $CH_2Cl_2$ were also prepared at 5%, 10, 15%, and 20% levels and used as the solvent for 0.1 M EtOD solutions for FT-IR.

The FT-IR results from between 2750 and 2550 $cm^{-1}$ showed a modest H-bond value, calculated to a Crowley value of about 7.

| Principal Component | Hildebrand | Crowley Values | Dielectric | Dipole Moment |
|---|---|---|---|---|
| Trioxane | 20 | 7 | 8 | 2 |
| $CH_2Cl_2$ | 19.8 | 1.5 | 9 | 5 |
| Tetrahydrofuran | 20 | — | — | — |
| Dioxane | 20.5 | — | — | — |

Based on these data and numbers in "Solubility Parameters" of the Chemical Rubber Co., trioxane is similar to esters and methylene chloride.

EXAMPLE 2

A stripper composition was prepared to determine the similarity of trioxane to $CH_2Cl_2$ and its usefulness as a stripper. The composition contained 100 grams trioxane, 100 grams toluene, and 100 grams n-butanol. These materials were mixed and filtered. Endothermic behavior was noted. The solution was then applied to a sample of white paint of unknown composition which was more than 2 years old. The white paint lifted.

EXAMPLE 3

The composition of Example 2 was tested on a varnish and also resulted in lifting the coating.

EXAMPLE 4

The composition of Example 2 was additionally applied to an epoxy paint and similarly resulted in lifting.

EXAMPLE 5

Neat methylene chloride was applied to the paint, varnish, and epoxy coatings of Examples 2, 3, and 4 and also caused lifting but did so more quickly.

EXAMPLES 6-12

Six paint stripper solutions, weighing 500 grams, were made up by weight. The trioxane caused a strong endotherm. In addition, the formulation in Example No. 11 was prepared according to German Offenlegunosschrift No. 2,123,563, using ethyl acetate. These formulations are as follows:

| EXAMPLES | COMPOSITIONS |
|---|---|
| 6 | 20% methanol, 80% methylene chloride |
| 7 | 50% xylene, 50% methanol |
| 8 | 50% xylene, 50% n-butanol |
| 9 | 33.3% xylene, 33.3% n-butanol, 33.3% trioxane |
| 10 | methanol at saturation with trioxane |
| 11 | 80% ethyl acetate, 20% trioxane |
| 12 | 33.3% xylene, 33.3% methanol, 33.3% trioxane |

In Example 10, a 50% solution of trioxane in methanol was attempted, but the trioxane was only partially soluble, so that it was considered to be a saturated solution. In Example 9, the trioxane was also not totally soluble and was similarly used as a saturated solution.

Four coatings test samples were prepared on glass panels, as a first set of 48 panels, by using a six mil drawdown blade with commercial paints. The panels were 6 inches by 8 inches. The coatings were allowed to dry for 48 hours and then tested at ambient temperatures. A second set was also dried for 48 hours and then cured in an oven at 120° F. for 7 days before testing at ambient temperature (24-25° C.). These coatings were an alkyd, a latex, a urethane, and a varnish; they were purchased at a retail outlet.

The alkyd coating was made with Rust Preventative Ace Quick Drying Exterior Enamel Alkyd #197-23 Dutch Orange.

The latex coating was made with Ace-Tone Acrylic Latex Semi-Gloss Enamel #186-114 Sea Green Interior.

The varnish was prepared with McCloskey Heirloom Clear Varnish High Gloss #0092.

The urethane coating was made with Deftane Clear Gloss #1, Polyurethane Finish Interior/Exterior.

When conducting the test for stripping effectiveness, a 2-ml sample of a stripper composition was placed on one of the 12 coated glass panels for each coating and covered with a watch glass while a timer was started. When the film lifted across the drawdown, the timer was stopped, and a time to strip was recorded. The results of the tests on the four coatings in each set are shown in Table IV.

TABLE IV

| | TIME REQUIRED FOR INDICATED COATING TO LIFT AFTER APPLICATION OF STRIPPER COMPOSTION, SECONDS | | | | | | | |
|---|---|---|---|---|---|---|---|---|
| | Alkyd | | Acrylic Latex | | Varnish | | Urethane | |
| Example No. | 2 days | 1 week[a] | 2 days | 1 week[a] | 2 days | 1 week[a] | 2 days | 1 week[a] |
| 6 | 5 | 10 | 28 | 29 | 5 | 13 | 9 | 10 |
| 7 | 37 | 60 | 100 | 91 | 32 | 56 | 53 | 51 |
| 8 | 100 | 171 | 160 | 300 | 93 | 200 | 140 | 208 |
| 9 | 48 | 110 | 70 | 140 | 39 | 110[b] | 8 | 87 |
| 10 | 93 | 93 | 64 | 120 | 300 | 300 | 80 | 65 |
| 11 | 48 | 48 | 60 | 140[c] | 65[c] | 75[c] | 80 | 160 |
| 12 | 30 | 35 | 33 | 58 | 31 | 46 | 50 | 42 |

Note:
All coatings were 6 mil drawdowns on glass matrix.
[a]Allowing 2 days at room temperature followed by one week at 120° F. (Set No. 2)
[b]Not true lift but specks of lift.
[c]No true lift but soft and some spot delamination.

EXAMPLE 13

A test of an epoxy paint was made by coating two steel panels with a very hard-to-strip epoxy of a proprietary formulation. After curing, the panels were exposed to the solvent compositions of Examples 6 and 12. Neither composition stripped the coating in 5 minutes (300 seconds). After 30 minutes, the composition of Example 12 released the coating in part, and the composition of Example 6 loosened the film slightly. Neither did the job well.

EXAMPLE 14

A stripper composition is made of 33% xylene, 33% n-butanol, and 33% trioxane, as in Example 9, and is heated to 35° C. All of the trioxane appears to be in solution. A piece of wood, coated with an obviously old alkyd paint, is dipped into the warm stripper. Lifting activity is noted promptly.

EXAMPLE 15

Another stripper composition is prepared with 25% of xylene, 25% of a 95% ethanol/5% water solution, and 50% of trioxane. At 25° C, trioxane should dissolve in a 95.5% ethanol/water solvent to the extent of 28 parts to 100. Assuming that the same solubility holds in this composition, it is 32% xylene, 32% ethanol/$H_2O$ and 36% trioxane. A piece of the same wood coated with the same alkyd paint of unknown age is dipped into the stripper at ambient temperature and lift off is observed within a short time.

EXAMPLE 16

The composition of Example 15 is heated to 35° C., and a piece of the same painted wood is dipped therein. Lifting of the coating is observed quickly.

EXAMPLE 17

The composition of Examples 15 and 16 is heated to 45° C., and a piece of the same wood coated with the same alkyd paint is dipped thereinto. Lift off is observed very quickly.

EXAMPLE 18

The stripper composition of Examples 15-17 is heated to 60° C., and a piece of the same painted wood is dipped thereinto, with lift off being observed immediately.

These crude tests appear to indicate that trioxane can be formulated as a slurry which then can be used at an elevated temperature at which it is in solution. These compositions should therefore be suitable for hot dip usage in a stripper tank.

EXAMPLE 19-21

An eight-inch wide pine board, painted white with an alkyd paint that is slightly weathered and known to be about six years old, and a six-inch wide board of Douglas fir, painted yellow with a latex paint and also slightly weathered and about five years old, are selected from a pile of used lumber stored under a shed. Each board is sawn transversely to provide specimens having a width of 3 inches.

Paraffin wax (1.5 parts) is added to commercial xylene, and the mixture is used as the xylene component in preparing solvent compositions for Examples 19-21.

A high-intensity ultraviolet lamp is also positioned about six inches to one side of a vertical surface against which selected specimens are placed before adding a test composition, as also indicated in Table V. The ultraviolet light is believed to be representative of ultraviolet radiation from the sun on a summer day.

A laboratory oven is set at 50° C. (122° F.), and selected specimens, as indicated in the last column in Table V, are maintained therein at least 2 hours before positioning against a vertically disposed hot plate which is maintained at the same temperature. This temperature is believed to be closely representative of temperatures typically occurring at the surface of painted clapboards on a hot summer day.

The specimens are supported adjacent to the vertical surface. Using a brush, approximately one milliliter of a test composition, prepared as indicated in Table V, is coated from the top to the center of each specimen while a stopwatch is started, and another millileter of the same composition is immediately applied from the bottom to the center of the same specimen. After 100 seconds, the condition of the coatings beneath the test composition at the top half of the specimen is noted, and then the condition of the coatings beneath the test composition at the bottom half is noted after 200 seconds.

Lift off after 100 seconds is indicated in Table VI by $R_1$, and lift off after 200 seconds is indicated in Table VI by $R_2$. If no liftoff is seen after 200 seconds, delamination and/or softening is recorded as D, or speck removal is recorded as S. If no change is observed, an N is recorded.

TABLE V

| Contents and Exposure Conditions For Test Compositions | | | | | |
|---|---|---|---|---|---|
| Ex. No. | Trioxane | MeOH | Xylene | UV | Heat |
| 19 | 20 | 40 | 40 | N | N |
| 20 | 25 | 40 | 35 | Y | N |
| 21 | 30 | 35 | 35 | N | Y |

TABLE VI

| | Stripping Performance Within 200 seconds | |
|---|---|---|
| Ex. No. | Alkyd | Latex |
| 19 | $R_1$ | $R_2$ |
| 20 | $R_1$ | $R_2$ |
| 21 | $R_1$ | $R_2$ |

EXAMPLE 22

A stripper composition was made from 80 wt. % xylene and 20 wt. % trioxane. The stripper was tested for stripping ability with respect to four types of coatings which were aged for 2 days at room temperature as in Examples 6-12. The results are set forth in Table VII wherein the time in seconds represents the time required for the coating to lift from the surface after application of the stripper.

TABLE VII

| STRIPPING ABILITY OF 80% XYLENE/20% TRIOXANE | |
|---|---|
| Alkyd | 110 sec. |
| Varnish | 45 sec. |
| Urethane | 115 sec. |
| Latex | 75 sec. Poor lift |

What is claimed is:

1. A composition for stripping coatings from surfaces, comprising about 20 to 50 wt. % trioxane, about 25 to 55 wt. % of an aromatic hydrocarbon, and about 25 to 55 wt. % of an aliphatic alcohol.

2. The composition of claim 1, wherein said aromatic hydrocarbon is selected from the group consisting of benzene, toluene, xylenes, ethylbenzene, alkylbenzenes having an alkane end which is not more than a $C_5$ hydrocarbon and mono-hetero substituted aromatics.

3. The composition of claim 1, wherein said aromatic hydrocarbon is a xylene or mixtures of xylenes selected from the group consisting of o-xylene, m-xylene, and p-xylene.

4. The composition of claim 1, wherein said aliphatic alcohol is selected from the group consisting of methanol, ethanol, isopropanol, n-propanol, and butanol.

5. The composition of claim 1, wherein said alcohol is methanol.

6. The composition of claim 1, wherein said trioxane is only partially in solution and said composition is a slurry.

7. The composition of claim 4, wherein said alcohol is 95% ethanol and 5% water.

8. The composition of claim 1 comprising about 25-40 wt. % trioxane, about 30-50 wt. % of said aromatic hydrocarbon and about 30-50 wt. % of said alcohol.

9. The composition of claim 8 wherein said aromatic hydrocarbon and alcohol are provided in equal parts in said composition.

10. The composition of claim 9 wherein said alcohol is methanol.

11. The composition of claim 9 wherein said aromatic hydrocarbon is a xylene.

12. The composition of claim 9 wherein said alcohol is methanol and said aromatic hydrocarbon is a xylene.

* * * * *